United States Patent
Chen et al.

(10) Patent No.: US 10,677,317 B2
(45) Date of Patent: Jun. 9, 2020

(54) ROTATION-MOVEMENT CONVERSION LINEAR GEAR MECHANISM

(71) Applicant: SOUTH CHINA UNIVERSITY OF TECHNOLOGY, Guangzhou, Guandong (CN)

(72) Inventors: Yangzhi Chen, Guangzhou (CN); Yueling Lv, Guangzhou (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 16/326,843

(22) PCT Filed: Dec. 19, 2016

(86) PCT No.: PCT/CN2016/110655
§ 371 (c)(1),
(2) Date: Feb. 20, 2019

(87) PCT Pub. No.: WO2018/036034
PCT Pub. Date: Mar. 1, 2018

(65) Prior Publication Data
US 2019/0211901 A1    Jul. 11, 2019

(30) Foreign Application Priority Data
Aug. 23, 2016    (CN) .......................... 2016 1 0711803

(51) Int. Cl.
*F16H 1/04* (2006.01)
*F16H 55/08* (2006.01)
*F16H 35/00* (2006.01)

(52) U.S. Cl.
CPC ............... *F16H 1/04* (2013.01); *F16H 55/08* (2013.01); *F16H 2035/003* (2013.01); *F16H 2055/0893* (2013.01)

(58) Field of Classification Search
CPC ...... F16H 1/04; F16H 55/08; F16H 2035/003; F16H 2055/0893
See application file for complete search history.

(56) References Cited

U.S. PATENT DOCUMENTS

| | | | |
|---|---|---|---|
| RE28,926 E * | 8/1976 | Baxter, Jr. | F16H 55/08 74/462 |
| 4,722,238 A * | 2/1988 | Navarro | B23F 1/06 74/422 |
| 5,605,071 A * | 2/1997 | Buchanan, Jr. | F16H 1/16 188/134 |

(Continued)

*Primary Examiner* — David M Fenstermacher
(74) *Attorney, Agent, or Firm* — JCIPRNET

(57) ABSTRACT

The present invention discloses a line gear mechanism for rotation-movement conversion, comprising a driving line gear (1) and a driven line gear (2). A stagger angle between an axis of the driving line gear and an axis of the driven line gear is any value from 0° to 180°. By a point contact meshing between a driving contact curve of a driving line tooth on the driving line gear (1) and a driven contact curve of a driven line tooth on the driven line gear (2), and by utilizing rotation of the driving line gear (1), it achieves that the driven line gear (2) rotates while moving smoothly. The line gear mechanism for rotation-movement conversion is simple in structure, easy to design, can achieve small displacement of movement, and is especially suitable for the conversion of small machinery from rotation to linear motion.

1 Claim, 3 Drawing Sheets

(56) References Cited

U.S. PATENT DOCUMENTS

| | | | |
|---|---|---|---|
| 2003/0198526 A1* | 10/2003 | Colbourne | B23F 15/00 409/1 |
| 2009/0165585 A1* | 7/2009 | Zhuravlev | F16H 55/08 74/462 |
| 2013/0025394 A1* | 1/2013 | Fan | F16H 55/088 74/417 |
| 2014/0144268 A1* | 5/2014 | Ward | F01C 21/02 74/397 |
| 2014/0345405 A1* | 11/2014 | Radzevich | F16H 55/08 74/412 R |

* cited by examiner

ROTATION-MOVEMENT CONVERSION LINEAR GEAR MECHANISM

TECHNICAL FIELD

The present invention relates to the technical field of mechanical transmission and micro electro mechanical system, and in particular, to a line gear mechanism for rotation-movement conversion.

BACKGROUND

Conversion from rotation to linear motion, is mainly used in various occasions such as machine tools, motors and indexing mechanisms, and the most commonly used mechanisms for realizing this function include chains, steel wire ropes, driving belts, cams, pneumatics, hydraulics, racks or screw rods. Different mechanisms can be used for different occasions of conversion from rotation to linear motion, and they also have different advantages and disadvantages. For example, although the pinion and rack has advantages such as unlimited stroke, heavy load and convenient installation, there are also disadvantages such as backlash, large vibration in agglutination between teeth, large noise and difficulty in ensuring consistency of accuracy. Although belt drive has advantages of fast running speed, low noise and low cost, it has poor rigidity, easy wear and fatigue, low precision, small thrust, and etc. Although the screw rod has high precision, good rigidity and low noise, it has disadvantages such as short stroke, slow speed, difficulty in ensuring consistency of stroke accuracy, and etc.

Line gear is a new-type gear, which is mainly based on a space curve meshing theory. Different from the traditional meshing theory of surface contact or line contact, this theory is a pair of spatial conjugate curves realizing transmission gear by point meshing. The invention and research of the line gear have been developed for more than ten years. It has advantages such as small size, large transmission ratio and convenient manufacturing and it is mainly used in the field of micro transmission. For the research of the line gear, the current focus is mainly on transmission from rotation to rotation between two-inclined axes of a same plane, or in two staggered axes of different planes, while the line gear mechanism for conversion from rotation to linear motion has not yet begun to be involved into.

SUMMARY OF THE INVENTION

The present invention designs a line gear mechanism capable of providing rotation-movement conversion for a micro-mechanical device. According to the present invention, a stagger angle between an axis of a driving line gear and an axis of a driven line gear of the line gear mechanism for rotation-movement conversion is any value from 0° to 180°, and it has a small mass, is simple in manufacture, has a low cost, and is especially easy to be applied in the micro electro mechanical field. The present invention is achieved by the following technical solution.

A line gear mechanism for rotation-movement conversion, the mechanism comprises a driving line gear and a driven line gear. Driving line teeth and a driving line gear wheel body constitute the driving line gear, and driven line teeth and a driven line gear wheel body constitute the driven line gear. A minimum number of the driving line tooth can be 1, and the number of the driven line teeth is related to a transmission ratio and a distance of linear movement. The driving line gear and the driven line gear form a pair of transmission pairs, and the stagger angle between the axis of the driving wheel and the axis of the driven wheel is 0° to 180°.

Further, the driving line teeth and the driven line teeth are entities respectively formed by moving along a driving contact curve and a driven contact curve as a conductor with a closed curve of an arbitrary shape as a generatrix. The driving contact curve and the driven contact curve are a pair of conjugate space curves conforming to a space curve meshing equation of the line gear mechanism for rotation-movement conversion.

Further, a transmission of the line gear mechanism for rotation-movement conversion is realized by a point contact meshing between the driving contact curve on the driving line tooth and the driven contact curve on the driven line tooth, the driving contact curve and the driven contact curve being a pair of conjugate contact curves. That is, when the driving line gear rotates, the driven line gear that meshes with it moves smoothly in an axial direction while rotating.

Further, the space curve meshing equation of the line gear mechanism for rotation-movement conversion is determined as follows: o-xyz and $o_q$-$x_q y_q z_q$ are two space Cartesian coordinate system, o is an origin of the coordinate system o-xyz with an arbitrary position, and x、y、z are three coordinate axes of the coordinate system o-xyz; $o_q$ is an origin of the coordinate system $o_q$-$x_q y_q z_q$, and $x_q$、$y_q$、$z_q$ are three coordinate axes of the coordinate system $o_q$-$x_q y_q z_q$; a plane xoz is in a same plane as a plane $x_p o_p z_p$, a distance from the origin $o_q$ to a plane yoz is |a|, a distance from the origin $o_q$ to a plane xoy is |b|, a distance from the origin $o_q$ to the plane xoz is |b|, the y axis is parallel to the $y_q$ axis, and an angle between the z axis and the $z_p$ axis is $(\pi-\theta)$, with 0°≤θ≤180°; a space Cartesian coordinate system $o_1$-$x_1 y_1 z_1$ is fixedly connected with the driving line gear, $o_1$ is an origin of the coordinate system $o_1$-$x_1 y_1 z_1$, and $x_1$、$y_1$、$z_1$ are three coordinate axes of a coordinate system $o_1$-$x_1 y_1 z_1$; a space Cartesian coordinate system $o_3$-$x_3 y_3 z_3$ is fixedly connected with the driven line gear, $o_3$ is an origin of the coordinate system $o_3$-$x_3 y_3 z_3$, $x_3$、$y_3$、$z_3$ are three coordinate axes of the coordinate system $o_3$-$x_3 y_3 z_3$, and an initial meshing place of the driving line gear and the driven line gear is an initial position; at the initial position, the coordinate systems $o_1$-$x_1 y_1 z_1$ and $o_3$-$x_3 y_3 z_3$ coincide with the coordinate systems o-xyz and $o_q$-$x_q y_q z_q$, respectively; at any time, the origin $o_1$ coincides with o, the $z_1$ axis coincides with the z axis, the origin $o_3$ coincides with $o_q$, and the $z_3$ axis coincides with the $z_q$ axis;

when 0°≤θ<90°, the driving line gear rotates about the z axis at a uniform angular velocity $\overline{\omega}_1$, a direction of the angular velocity of the driving line gear is a negative direction of the z axis, and an angle that the driving line gear rotates through about the z axis is $\varphi_1$; the driven line gear rotates about the $z_q$ axis at a uniform angular velocity $\overline{\omega}_2$, a direction of the angular velocity of the driven line gear is a negative direction of the $z_q$ axis, and an angle that the driven line gear rotates through about the $z_q$ axis is $\varphi_3$; meanwhile, the driven line gear moves along the negative direction of the $z_q$ axis with a speed of A, a displacement of the driven line gear has a magnitude of s, and then a space curve meshing equation of the line gear mechanism for rotation-movement conversion is:

$$y_M^{(1)}\overline{\omega}_1\beta_x^{(1)} - x_M^{(1)}\overline{\omega}_1\beta_y^{(1)} + y_M^{(1)}\overline{\omega}_2\beta_x^{(1)}\cos\theta - \overline{\omega}_2 x_M^{(1)}\beta_y^{(1)}\cos\theta(A\sin\theta - c\overline{\omega}_2\cos\theta)\beta_x^{(1)}\cos\varphi_1 + (A\sin\theta - c\overline{\omega}_2\cos\theta)\beta_y^{(1)}\sin\varphi_1 + (\overline{\omega}_2\sin\theta(z_M^{(1)} - b + s) + \overline{\omega}_2 a\cos\theta)(\beta_x^{(1)}\sin\varphi_1) - \overline{\omega}_2\sin\theta(z_M^{(1)} - b + s) + \overline{\omega}_2 a\cos\theta)(\beta_y^{(1)}\cos\varphi_1) + (-A\cos\theta - \overline{\omega}_2\sin\theta x_M^{(1)}\sin\varphi_1 + \overline{\omega}_2\sin\theta y_M^{(1)}\cos\varphi_1 - c\overline{\omega}_2\sin\theta)\beta_z^{(1)} = 0$$

wherein, $$\begin{cases} x_M^{(1)} = x_M^{(1)}(t) \\ y_M^{(1)} = y_M^{(1)}(t) \\ z_M^{(1)} = z_M^{(1)}(t) \end{cases}$$

is an equation of the driving contact curve of the driving line gear, t is a parameter, $\beta^{(1)}=\beta_x^{(1)}i^{(1)}+\beta_y^{(1)}j^{(1)}+\beta_z^{(1)}k^{(1)}$ is a unit vector of a principal normal of the driving contact curve of the line gear mechanism at a meshing point in the coordinate system $o_1-x_1y_1z_1$, $i^{(1)}$, $j^{(1)}$ and $k^{(1)}$ and $k^{(1)}$ are unit vectors of the $x_1$, $y_1$, $z_1$ axes, respectively, an equation of the driven contact curve of the driven line gear in the coordinate system $o_3-x_3y_3z_3$ is:

$$\begin{cases} x_M^{(3)} = (-\cos\varphi_1\cos\varphi_3\cos\theta+\sin\varphi_1\sin\varphi_3)x_M^{(1)} + \\ \quad (-\sin\varphi_1\cos\varphi_3\cos\theta-\cos\varphi_1\sin\varphi_3)y_M^{(1)} - \\ \quad \cos\varphi_3\sin\theta z_M^{(1)} + (-a\cos\varphi_3\cos\theta+b\cos\varphi_3\sin\theta+ \\ \quad c\sin\varphi_3) \\ y_M^{(3)} = (-\cos\varphi_1\sin\varphi_3\cos\theta-\sin\varphi_1\cos\varphi_3)x_M^{(1)} + \\ \quad (-\sin\varphi_1\sin\varphi_3\cos\theta+\cos\varphi_1\cos\varphi_3)y_M^{(1)} - \\ \quad \sin\varphi_3\sin\theta z_M^{(1)} + (-a\sin\varphi_3\cos\theta+b\sin\varphi_3\sin\theta-c\cos\varphi_3) \\ z_M^{(3)} = \cos\varphi_1\sin\theta x_M^{(1)} + \sin\varphi_1\sin\theta y_M^{(1)} - \cos\theta z_M^{(1)} + a\sin\theta + \\ \quad b\cos\theta - s \end{cases}$$

wherein, $\overline{\omega}_2 = i_{21}\overline{\omega}_1$, $\varphi_3 = i_{21}\varphi_1$, $i_{21}$ is a transmission ratio of the driving line gear to the driven line gear.

When $90° \le 180°$, the driving line gear rotates about the z axis at the uniform angular velocity $\overline{\omega}_1$, the direction of the angular velocity of the driving line gear is the negative direction of the z axis, at this moment, the driven line gear rotates about the $z_q$ axis at an angular velocity with a magnitude of $\omega_2$ and a direction being a positive direction of the $z_q$ axis; meanwhile, the driven line gear moves along the $z_q$ axis at a speed with a magnitude of A and a direction being the positive direction of the $z_q$ axis, an angle that the driving line gear rotates through about the z axis is $\varphi_1$, an angle that the driven line gear rotates through about the $z_q$ axis is $-\varphi_3$, a displacement of moving along the $z_q$ axis is s, and then the spatial space curve meshing equation of the mechanism is:

$-y_M^{(1)}\overline{\omega}_1\beta_x^{(1)}+x_M^{(1)}\overline{\omega}_1\beta_y^{(1)}+y_M^{(1)}\overline{\omega}_2\beta_x^{(1)}\cos\theta-$
$\overline{\omega}_2 x_M^{(1)}\beta_y^{(1)}\cos\theta+(-A\sin\theta-c\overline{\omega}_2\cos\theta)\beta_x^{(1)}\cos$
$\varphi_1+(-A\sin\theta-c\overline{\omega}_2\cos\theta)\beta_y^{(1)}\sin\varphi_1+(\omega_2\sin$
$\theta(z_M^{(1)}-b-s)+\overline{\omega}_2 a\cos\theta)(\beta_x^{(1)}\sin\varphi_1)-(\overline{\omega}_2\sin$
$\theta(z_M^{(1)}-b-s)+\overline{\omega}_2 a\cos\theta)(\beta_y^{(1)}\cos\varphi_1)+(A\cos\theta-$
$\overline{\omega}_2\sin\theta x_M^{(1)}\sin\varphi_1+\overline{\omega}_2\sin\theta y_M^{(1)}\cos\varphi_1-c\overline{\omega}_2$
$\sin\theta)\beta_z^{(1)}=0$ wherein, $$\begin{cases} x_M^{(1)} = x_M^{(1)}(t) \\ y_M^{(1)} = y_M^{(1)}(t) \\ z_M^{(1)} = z_M^{(1)}(t) \end{cases}$$

is an equation of the driving contact curve of the driving line gear in the coordinate system $o_1-x_1y_1z_1$, t is a parameter, $\beta^{(1)}=\beta_x^{(1)}i^{(1)}+\beta_y^{(1)}j^{(1)}+\beta_z^{(1)}k^{(1)}$ is a unit vector of a principal normal of the driving contact curve of the mechanism at a meshing point in the coordinate system $o_1-x_1y_1z_1$, $i^{(1)}$, $j^{(1)}$ and $k^{(1)}$ are unit vectors of the $x_1$, $y_1$, $z_1$ axes, respectively, an equation of the driven contact curve of the driven line gear in the coordinate system $o_3-x_3y_3z_3$ is:

$$\begin{cases} x_M^{(3)} = (-\cos\varphi_1\cos\varphi_3\cos\theta-\sin\varphi_1\sin\varphi_3)x_M^{(1)} + \\ \quad (-\sin\varphi_1\cos\varphi_3\cos\theta+\cos\varphi_1\sin\varphi_3)y_M^{(1)} - \\ \quad \cos\varphi_3\sin\theta z_M^{(1)} + (-a\cos\varphi_3\cos\theta+b\cos\varphi_3\sin\theta-c\sin\varphi_3) \\ y_M^{(3)} = (\cos\varphi_1\sin\varphi_3\cos\theta-\sin\varphi_1\cos\varphi_3)x_M^{(1)} + \\ \quad (\sin\varphi_1\sin\varphi_3\cos\theta+\cos\varphi_1\cos\varphi_3)y_M^{(1)} + \\ \quad \sin\varphi_3\sin\theta z_M^{(1)} + (a\sin\varphi_3\cos\theta-b\sin\varphi_3\sin\theta-c\cos\varphi_3) \\ z_M^{(3)} = \cos\varphi_1\sin\theta x_M^{(1)} + \sin\varphi_1\sin\theta y_M^{(1)} - \cos\theta z_M^{(1)} + a\sin\theta + \\ \quad b\cos\theta + s \end{cases}$$

wherein $\overline{\omega}_2 = i_{21}\overline{\omega}_1$, $\varphi_3 = i_{21}\varphi_1$, $i_{21}$ is a transmission ratio of the driving line gear to the driven line gear.

In the present invention, the driving contact curve and the driven contact curve are a pair of conjugate space curves designed to conform to the space curve meshing equation of the line gear mechanism with conversion from rotation to linear motion, which is different from the traditional space curve surface meshing staggered shaft gear mechanism, and also different from the line gear suitable for intersect axes and the line gear suitable for the staggered axes, which are based on the space curve meshing principle and for which the applicant has filed applications. The present invention realizes that, when the driving line gear rotates, the driven line gear that meshes with it moves along the axis while rotating, resulting in a change in the space curve meshing equation and a change in the driven contact curve equation.

Compared with the prior art, the present invention has following advantages:

(1) Realizing rotation-movement conversion between two staggered axes with stagger angle of arbitrary angle: the line gear pair in the present invention can realize the transmission between two spatially staggered axes, and the stagger angle between the two staggered axes can be any value from 0° to 180°. According to different stagger angle, different gear mechanism can be obtained. Therefore, the mechanism realizing transmission at any position of any two axes in space may be designed according to requirements and is more extensive than pinion and rack transmission.

(2) Precise movement: the linear displacement stroke of the driven line gear is relatively small, and it is suitable for precise movement in micro field and is especially suitable for indexing mechanism that requires relatively small displacement after rotating by a turn.

(3) Simple structure: the driving wheel and the driven wheel form a pair of transmission pairs, and the meshing between the driving line gear and the driven line gear mainly depends on the point contact between the line tooth of the driving wheel and the line tooth of the driven wheel, so as long as the accuracy of the contact line is ensured, the design is simple and the process is convenient.

(4) Realizing rotating while moving: when the driving line gear rotates, the driven line gear that meshes with the driving line gear moves smoothly while rotating.

DETAILED DESCRIPTION OF THE PREFERRED EMBODIMENT

The implementation of the present invention will be further described below with reference to the accompanying drawings, and the present invention has been fully described for those skilled in the art, and the scope of protection of the present invention is not limited to the following content.

A space curve meshing equation of a line gear mechanism for rotation-movement conversion of the driving contact curve and the driven contact curve in the present invention is in accordance with the space curve meshing theory.

Figure 1:
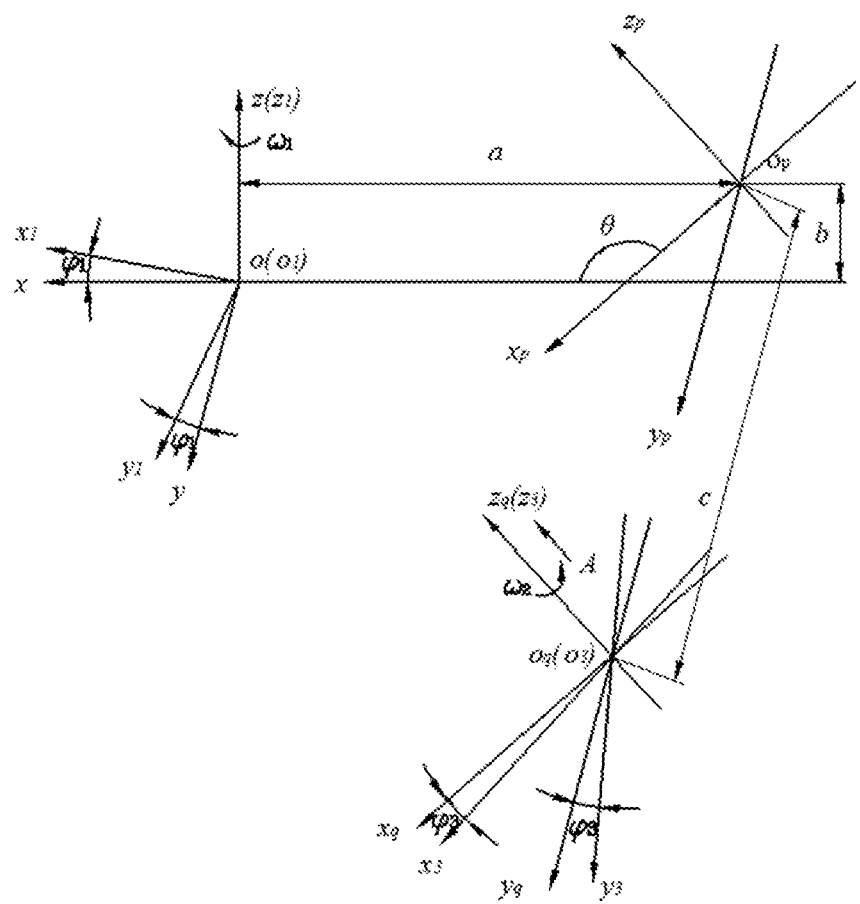
FIG. 1 is a schematic view of a spatial meshing coordinate system in an implementation.

FIG. 1 illustrates a schematic view of a spatial meshing coordinate system of a line gear mechanism for rotation-movement conversion. o–xyz, $o_p$–$x_p y_p z_p$ and $o_q$–$x_q y_q z_q$ are three space Cartesian coordinate system. o is an origin of the coordinate system o–xyz, and x、y、z are three coordinate axes of the coordinate system o–xyz. $o_p$ is an origin of the coordinate system $o_p$–$x_p y_p z_p$ and $x_p$、$y_p$、$z_p$ are three coordinate axes of the coordinate system $o_p$–$x_p y_p z_p$. $o_q$ is an origin of the coordinate system $o_q$–$x_q y_q z_q$, and $x_q$、$y_q$、$z_q$ are three coordinate axes of the coordinate system $o_q$–$x_q y_q z_q$. A plane xoz is in a same plane as a plane $x_p o_p z_p$, a distance from the origin $o_p$ to the z axis is |a|, and a distance from the origin $o_p$ to the x axis is |b|. $o_q$–$x_q y_q z_q$ is obtained by translating by a distance |c| along the direction $y_p$ based on $o_p$–$x_p y_p z_p$, an angle between the z axis and the $z_p$ axis has a supplementary angle of θ, 0°≤θ≤180°, and θ equals to the supplementary angle of the angle between the z axis and the $z_p$ axis. The space Cartesian coordinate system $o_1$–$x_1 y_1 z_1$ is fixedly connected with the driving line gear, $o_1$ is an origin of the coordinate system $o_1$–$x_1 y_1 z_1$, and $x_1$、$y_1$、$z_1$ are three coordinate axes of the coordinate system $o_1$–$x_1 y_1 z_1$. The space Cartesian coordinate system $o_3$–$x_3 y_3 z_3$ is fixedly connected with the driven line gear, $o_3$ is an origin of the coordinate system $o_3$–$x_3 y_3 z_3$ coordinate system, $x_3$、$y_3$、$z_3$ are three coordinate axes of the coordinate system $o_3$–$x_3 y_3 z_3$, and an initial meshing place of the driving line gear and the driven line gear is an initial position. At the initial position, the coordinate systems $o_1$–$x_1 y_1 z_1$ and $o_3$–$x_3 y_3 z_3$ coincide with the coordinate systems $o_q$–$x_q$ and $o_q$–$x_q y_q z_q$, respectively. At any time, the origin $o_1$ coincides with o, the $z_1$ axis coincides with the z axis, the origin $o_3$ coincides with $o_q$, and the $z_3$ axis coincides with the $z_q$ axis. The driving line gear rotates about the z axis at a uniform angular velocity $\overline{\omega}_1$, a direction of the angular velocity of the driving line gear is a negative direction of the z axis, as shown in FIG. 1, and an angle that the driving line gear rotates through about the z axis is $\varphi_1$. The driven line gear rotates about the $z_q$ axis at a uniform angular velocity $\overline{\omega}_2$, a direction of the angular velocity of the driven line gear is as shown in FIG. 1, and an angle that the driven line gear rotates through about the $z_q$ axis is $\varphi_3$. Meanwhile, the driven line gear moves along the negative direction of the $z_q$ axis with a speed of A, and a displacement of the driven line gear has a magnitude denoted by s.

Using the knowledge of differential geometry and space curve meshing theory, an equation (1) may be obtained:

$$\begin{cases} -y_M^{(1)}\varpi_1\beta_x^{(1)} + x_M^{(1)}\varpi_1\beta_y^{(1)} + y_M^{(1)}\varpi_2\beta_x^{(1)}\cos\theta - \\ \varpi_2 x_M^{(1)}\beta_y^{(1)}\cos\theta + (-A\sin\theta - c\varpi_2\cos\theta)\beta_x^{(1)}\cos\varphi_1 + \\ (-A\sin\theta - c\varpi_2\cos\theta)\beta_y^{(1)}\sin\varphi_1 + \\ (\varpi_2\sin\theta(z_M^{(1)} - b - s) + \varpi_2 a\cos\theta)(\beta_x^{(1)}\sin\varphi_1) - \\ (\varpi_2\sin\theta(z_M^{(1)} - b - s) + \varpi_2 a\cos\theta)(\beta_y^{(1)}\cos\varphi_1) + \\ (A\cos\theta - \varpi_2\sin\theta x_M^{(1)}\sin\varphi_1 + \\ \varpi_2\sin\theta y_M^{(1)}\cos\varphi_1 - c\varpi_2\sin\theta)\beta_z^{(1)} = 0 \\ x_M^{(1)} = x_M^{(1)}(t) \\ y_M^{(1)} = y_M^{(1)}(t) \\ z_M^{(1)} = z_M^{(1)}(t) \\ \varpi_2 = i_{21}\varpi_1 \\ \varphi_3 = i_{21}\varphi_1 \\ x_M^{(3)} = (-\cos\varphi_1\cos\varphi_3\cos\theta - \sin\varphi_1\sin\varphi_3)x_M^{(1)} + \\ (-\sin\varphi_1\cos\varphi_3\cos\theta + \cos\varphi_1\sin\varphi_3)y_M^{(1)} - \\ \cos\varphi_3\sin\theta z_M^{(1)} + (-a\cos\varphi_3\cos\theta + \\ b\cos\varphi_3\sin\theta - c\sin\varphi_3) \\ y_M^{(3)} = (\cos\varphi_1\sin\varphi_3\cos\theta - \sin\varphi_1\cos\varphi_3)x_M^{(1)} + \\ (\sin\varphi_1\sin\varphi_3\cos\theta + \cos\varphi_1\cos\varphi_3)y_M^{(1)} + \\ \sin\varphi_3\sin\theta z_M^{(1)} + (a\cos\varphi_3\cos\theta - \\ b\sin\varphi_3\sin\theta - c\cos\varphi_3) \\ z_M^{(3)} = \cos\varphi_1\sin\theta x_M^{(1)} + \sin\varphi_1\sin\theta y_M^{(1)} - \\ \cos\theta z_M^{(1)} + a\sin\theta + b\cos\theta + s \end{cases} \quad (1)$$

wherein, $$\begin{aligned} & -y_M^{(1)}\varpi_1\beta_x^{(1)} + x_M^{(1)}\varpi_1\beta_y^{(1)} + y_M^{(1)}\varpi_2\beta_x^{(1)}\cos\theta - \\ & \varpi_2 x_M^{(1)}\beta_y^{(1)}\cos\theta + (-A\sin\theta - c\varpi_2\cos\theta)\beta_x^{(1)}\cos\varphi_1 + \\ & (-A\sin\theta - c\varpi_2\cos\theta)\beta_y^{(1)}\sin\varphi_1 + \\ & (\varpi_2\sin\theta(z_M^{(1)} - b - s) + \varpi_2 a\cos\theta)(\beta_x^{(1)}\sin\varphi_1) - \\ & (\varpi_2\sin\theta(z_M^{(1)} - b - s) + \varpi_2 a\cos\theta)(\beta_y^{(1)}\cos\varphi_1) + \\ & (A\cos\theta - \varpi_2\sin\theta x_M^{(1)}\sin\varphi_1 + \\ & \varpi_2\sin\theta y_M^{(1)}\cos\varphi_1 - c\varpi_2\sin\theta)\beta_z^{(1)} = 0 \end{aligned} \quad (2)$$

Equation (2) is the space curve meshing equation of the line gear mechanism for rotation-movement conversion.

$$\begin{cases} x_M^{(1)} = x_M^{(1)}(t) \\ y_M^{(1)} = y_M^{(1)}(t) \\ z_M^{(1)} = z_M^{(1)}(t) \end{cases}$$

is an equation for the driving contact curve in the coordinate system $o_1$–$x_1 y_1 z_1$, and t is a parameter;

$\beta^{(1)}$ is a unit vector of a principal normal of the driving contact curve at a meshing point in the coordinate system $o_1$–$x_1 y_1 z_1$, i.e., $\beta^{(1)} = \beta_x^{(1)} i^{(1)} + \beta_y^{(1)} j^{(1)} + \beta_z^{(1)} k^{(1)}$, and $i^{(1)}$、$j^{(1)}$、$k^{(1)}$ are unit vectors of the $z_1$、$y_1$、$z_1$ axes, respectively.

In particular:

$$\beta_x^{(1)} = \frac{x_M^{(1)''}(t)\left[x_M^{(1)'}(t)^2 + y_M^{(1)'}(t)^2 + z_M^{(1)'}(t)^2\right] - x_M^{(1)'}(t)\left[x_M^{(t)'}(t)x_M^{(1)''}(t) + y_M^{(1)'}(t)y_M^{(1)''}(t) + z_M^{(1)'}(t)z_M^{(1)''}(t)\right]}{\left[x_M^{(1)'}(t)^2 + y_M^{(1)'}(t)^2 + z_M^{(1)'}(t)^2\right]^2}$$

$$\beta_y^{(1)} = \frac{y_M^{(1)''}(t)\left[x_M^{(1)'}(t)^2 + y_M^{(1)'}(t)^2 + z_M^{(1)'}(t)^2\right] - y_M^{(1)'}(t)\left[x_M^{(t)'}(t)x_M^{(1)''}(t) + y_M^{(1)'}(t)y_M^{(1)''}(t) + z_M^{(1)'}(t)z_M^{(1)''}(t)\right]}{\left[x_M^{(1)'}(t)^2 + y_M^{(1)'}(t)^2 + z_M^{(1)'}(t)^2\right]^2}$$

$$\beta_z^{(1)} = \frac{z_M^{(1)''}(t)\left[x_M^{(1)'}(t)^2 + y_M^{(1)'}(t)^2 + z_M^{(1)'}(t)^2\right] - z_M^{(1)'}(t)\left[x_M^{(t)'}(t)x_M^{(1)''}(t) + y_M^{(1)'}(t)y_M^{(1)''}(t) + z_M^{(1)'}(t)z_M^{(1)''}(t)\right]}{\left[x_M^{(1)'}(t)^2 + y_M^{(1)'}(t)^2 + z_M^{(1)'}(t)^2\right]^2}$$

$$\begin{cases} x_M^{(3)} = (-\cos\varphi_1 \cos\varphi_3 \cos\theta - \sin\varphi_1 \sin\varphi_3)x_M^{(1)} + \\ (-\sin\varphi_1 \cos\varphi_3 \cos\theta + \cos\varphi_1 \sin\varphi_3)y_M^{(1)} - \\ \cos\varphi_3 \sin\theta z_M^{(1)} + (-a\cos\varphi_3 \cos\theta + \\ b\cos\varphi_3 \sin\theta - c\sin\varphi_3) \\ y_M^{(3)} = (\cos\varphi_1 \sin\varphi_3 \cos\theta - \sin\varphi_1 \cos\varphi_3)x_M^{(1)} + \\ (\sin\varphi_1 \sin\varphi_3 \cos\theta + \cos\varphi_1 \cos\varphi_3)y_M^{(1)} + \\ \sin\varphi_3 \sin\theta z_M^{(1)} + (a\cos\varphi_3 \cos\theta - \\ b\sin\varphi_3 \sin\theta - c\cos\varphi_3) \\ z_M^{(3)} = \cos\varphi_1 \sin\theta x_M^{(1)} + \sin\varphi_1 \sin\theta y_M^{(1)} - \\ \cos\theta z_M^{(1)} + a\sin\theta + b\cos\theta + s \end{cases} \quad (3)$$

Equation (3) is an equation of the driven contact curve which is spatially conjugate with the driving contact curve in the coordinate system $o_3-x_3y_3z_3$;

in the equation: a, b, c—three coordinate scores of the origin $o_q$ in the coordinate system o–xyz (as shown in FIG. 1);

$\bar{\omega}_1, \bar{\omega}_2$—the angular velocity of rotation of the driving wheel and the driven wheel;

$i_{21}$—the transmission ratio of the driving wheel and the driven wheel.

When 0°—θ<90°, the direction of the driven wheel of angular velocity $\omega_2$ is contrary to the direction shown in FIG. 1, and a direction of $\varphi_3$ is also contrary to the direction shown in FIG. 1, while a direction of its moving velocity A is also contrary to the direction shown in FIG. 1, and the displacement s is also the negative direction of the $z_q$ axis. Therefore, $\bar{\omega}_2, \varphi_3$, A and s are inserted into the equations (2) and (3) to obtain the space curve meshing equation, a driving contact curve equation and a driven contact curve equation of the line gear mechanism for rotation-movement conversion at the angle θ, as shown in an equation (4):

$$\begin{cases} y_M^{(1)}\bar{\omega}_1\beta_x^{(1)} - x_M^{(1)}\bar{\omega}_1\beta_y^{(1)} + y_M^{(1)}\bar{\omega}_2\beta_x^{(1)} \cos\theta - \\ \bar{\omega}_2 x_M^{(1)}\beta_y^{(1)} \cos\theta \\ (A\sin\theta - c\bar{\omega}_2 \cos\theta)\beta_x^{(1)} \cos\varphi_1 + \\ (A\sin\theta - c\bar{\omega}_2 \cos\theta)\beta_y^{(1)} \sin\varphi_1 + \\ (\bar{\omega}_2 \sin\theta(z_M^{(1)} - b - s) + \bar{\omega}_2 a \cos\theta)(\beta_x^{(1)} \sin\varphi_1) - \\ (\bar{\omega}_2 \sin\theta(z_M^{(1)} - b + s) + \bar{\omega}_2 a \cos\theta)(\beta_y^{(1)} \cos\varphi_1) + \\ (-A\cos\theta - \bar{\omega}_2 \sin\theta x_M^{(1)} \sin\varphi_1 + \\ \bar{\omega}_2 \sin\theta y_M^{(1)} \cos\varphi_1 - c\bar{\omega}_2 \sin\theta)\beta_z^{(1)} = 0 \\ x_M^{(1)} = x_M^{(1)}(t) \\ y_M^{(1)} = y_M^{(1)}(t) \\ z_M^{(1)} = z_M^{(1)}(t) \\ \bar{\omega}_2 = i_{21}\bar{\omega}_1 \\ \varphi_3 = i_{21}\varphi_1 \\ x_M^{(3)} = (-\cos\varphi_1 \cos\varphi_3 \cos\theta - \sin\varphi_1 \sin\varphi_3)x_M^{(1)} + \\ (-\sin\varphi_1 \cos\varphi_3 \cos\theta + \cos\varphi_1 \sin\varphi_3)y_M^{(1)} - \\ \cos\varphi_3 \sin\theta z_M^{(1)} + (-a\cos\varphi_3 \cos\theta + \\ b\cos\varphi_3 \sin\theta + c\sin\varphi_3) \\ y_M^{(3)} = (-\cos\varphi_1 \sin\varphi_3 \cos\theta - \sin\varphi_1 \cos\varphi_3)x_M^{(1)} + \\ (-\sin\varphi_1 \sin\varphi_3 \cos\theta + \cos\varphi_1 \cos\varphi_3)y_M^{(1)} - \\ \sin\varphi_3 \sin\theta z_M^{(1)} + (-a\sin\varphi_3 \cos\theta + \\ b\sin\varphi_3 \sin\theta - c\cos\varphi_3) \\ z_M^{(3)} = \cos\varphi_1 \sin\theta x_M^{(1)} + \sin\varphi_1 \sin\theta y_M^{(1)} - \\ \cos\theta z_M^{(1)} + a\sin\theta + b\cos\theta - s \end{cases} \quad (4)$$

When 90°≤θ≤180°, the direction of the driven wheel of the angular velocity $\omega_2$ is the same as the direction shown in FIG. 1, the direction of $\varphi_3$ is also the same as the direction shown in FIG. 1, the direction of the moving velocity A is also shown as FIG. 1, and the direction of the displacement is the same as the direction of the $z_q$ axis. It may be obtained that the driving contact curve equation and the driven contact curve equation at the angle θ is shown in the equation (1).

According to the curve meshing equation, choosing different angle θ and driving contact curve equation, the relation between $\varphi_1$ and t may be obtained. Then according to the θ value, choosing the driven contact curve equation in the equation (3) or the equation (4), a conductor of the driving line tooth and a conductor of the driven line tooth may be obtained respectively. And a closed curve designed is the generatrix, and the generatrix moves along the two conductors respectively, and the obtained entities are the driving line tooth and the driven line tooth. According to actual requirements, the driving line gear wheel body and the driven line gear wheel body are designed, and thereby the driving line gear and the driven line gear are designed.

If the driving line gear of the driving line gear is a space cylindrical spiral, it satisfies an equation (5) in the coordinate system $o_1-x_1y_1z_1$:

$$\begin{cases} x_M^{(1)} = m\cos t \\ y_M^{(1)} = m\sin t \\ z_M^{(1)} = n\pi + nt \end{cases} \quad (5)$$

When 0°≤θ<90°, the equation (5) is inserted into the equation (3) to obtain the space curve meshing equation of the line gear mechanism with conversion from rotation to linear motion, as shown in an equation (6):

$$(-A\sin\theta + c\bar{\omega}_2\cos\theta)\cos(\varphi_1 - t) - (\bar{\omega}_2\sin\theta \\ (n\pi + nt - b + s) + \bar{\omega}_2 a\cos\theta)\sin(\varphi_1 - t) = 0 \quad (6)$$

When $90° \leq \theta < 180°$, the equation (5) is inserted into the equation (4) to obtain the space curve meshing equation of the line gear mechanism with conversion from rotation to linear motion, as shown in an (7):

$$(A\sin\theta + c\bar{\omega}_2\cos\theta)\cos(\varphi_1 - t) - (\bar{\omega}_2\sin\theta(n\pi + nt - b - s) + \\ \bar{\omega}_2 a\cos\theta)\sin(\varphi_1 - t) = 0 \quad (7)$$

Set $A = k\bar{\omega}_1$, then $s = k\varphi_1$. Substituting m=5 mm, n=8 mm, a=0 mm, b=0 mm, c=−30 mm, θ=30°, k=0.15, $\bar{\omega}_1 = \pi/2$, $t_s = -0.5\pi$, $t_e = 0\pi$ and $i_{21} = 1/3$ into the equation of the driving contact curve in the coordinate system $o_1-x_1 y_1 z_1$ can be obtained:

$$\begin{cases} x_M^{(1)} = 5\cos t \\ y_M^{(1)} = 5\sin t \\ z_M^{(1)} = 8\pi + 8t \end{cases} \quad (8)$$

By the equation (6) and the equation (3), and by three fitting, an equation of the driven contact curve in the coordinate system $o_3-x_3 y_3 z_3$ is:

$$\begin{cases} x_M^{(3)} = 0.4189 \times t^3 + 2.5757 \times t^2 - 7.8227 \times t - 24.2499 \\ y_M^{(3)} = 0.1943 \times t^3 - 2.1999 \times t^2 - 11.1985 \times t + 13.2385 \\ z_M^{(3)} = 0.0019 \times t^3 + 0.0297 \times t^2 - 7.3796 \times t - 23.1574 \end{cases} \quad (9)$$

Figure 2:
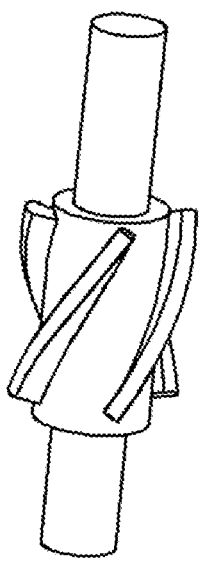
FIG. 2 is a schematic view of a driving line gear and its line tooth in an implementation.
Figure 3:
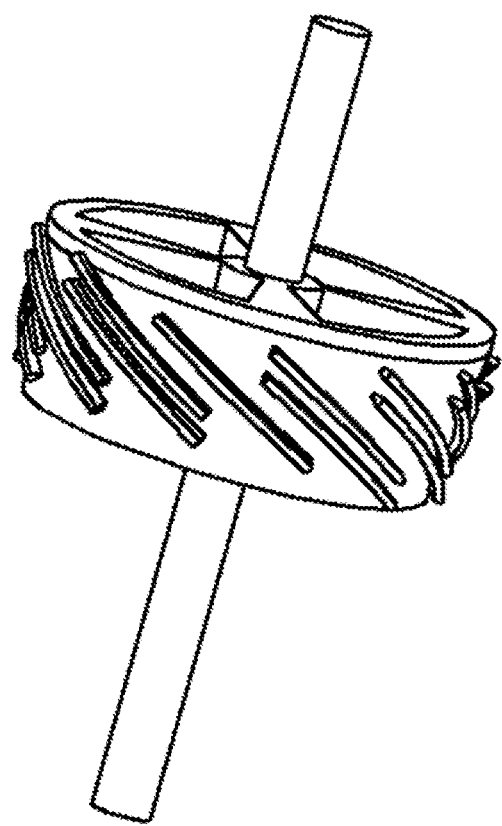
FIG. 3 is a schematic view of a driven line gear and its line tooth in an implementation.
Figure 4:
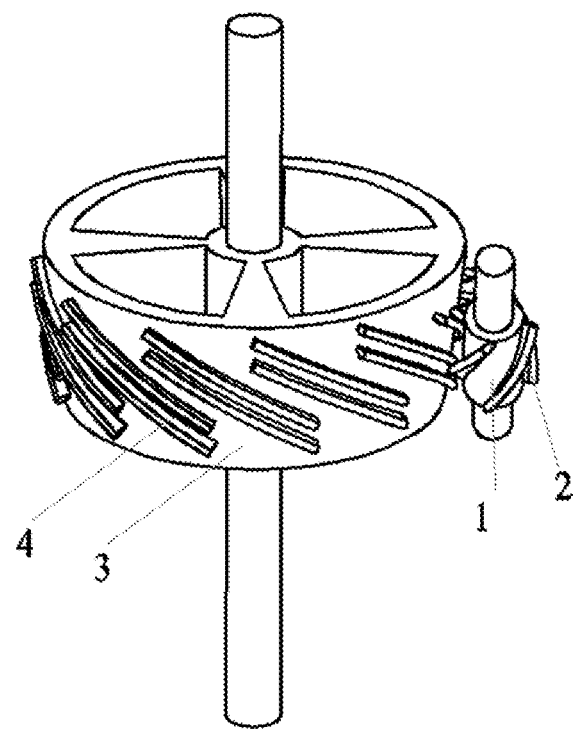
FIG. 4 is a schematic view of meshing of the driving line gear and driven line gear in an implementation.

According to the equations (8) and (9), and according to the required section, the line tooth entity can be established. The line tooth body only needs to meet the strength requirement, and the line tooth body and the line gear wheel body themselves have no special shape requirements. The number of the driving line teeth is set as $N_1 = 4$, and according to the requirements to the transmission ratio and the moving displacement, the number of the driven line teeth is set as $N_2 = 23$. It is worth mentioning that when the contact curve of the driven line gear is designed, the contact curve of the next line tooth moves on the z axis based on the contact curve of the previous line tooth by a moving distance of one line tooth, and rotates by an angle of rotation of one line tooth. Utilizing this method, it may obtain a schematic view of the driving line gear and its line tooth as shown in FIG. 2, a schematic view of the driven line gear and its line tooth as shown in FIG. 3, and a schematic view of meshing of the driving line gear and driven line gear as shown in FIG. 4. In FIG. 4, 1 represents the driving line gear, 2 represents the driving line tooth, 3 represents the driven line gear and 4 represents the driven line tooth.

The present invention provides a method and a mechanism which are capable of converting rotation to movement for capable of providing rotation-movement conversion for a micro-mechanical device. This mechanism greatly simplifies the structure of the micromechanical transmission, realizes the rotation-movement conversion motion of the spatially staggered axes, reduces the geometry, reduces the mass, improves the flexibility of operation, is simple in production, has a low cost, and is easy to be applied in the micro electro mechanical field.

What is claimed:

1. A line gear mechanism for rotation-movement conversion, characterized in that, the line gear mechanism comprises a driving line gear and a driven line gear, the driving line gear and the driven line gear forms a transmission pair, as the driving line gear rotates, the driven line gear moves smoothly while rotating, and a stagger angle between an axis of the driving line gear and an axis of the driven line gear is 0° to 180°, wherein the transmission pair of the mechanism realizes transmission of the line gear mechanism by a point contact meshing between a driving contact curve on a driving line tooth and a driven contact curve on a driven line tooth, the driving contact curve and the driven contact curve being a pair of conjugate contact curves, and a space curve meshing equation of the line gear mechanism for rotation-movement conversion is determined as follows: o−xyz and $o_q - x_q y_q z_q$ are two space Cartesian coordinate systems, o is an origin of the coordinate system o−xyz with an arbitrary position, and x, y, z are three coordinate axes of the coordinate system o−xyz; $o_q$ is an origin of the coordinate system $o_q - x_q y_q z_q$, and $x_q$, $y_q$, $z_q$ are three coordinate axes of the coordinate system $o_q - x_q y_q z_q$; a plane xoz is in a same plane as a plane $x_p o_p z_p$, a distance from the origin $o_q$ to a plane yoz is |a|, a distance from the origin $o_q$ to a plane xoy is |b|, a distance from the origin $o_q$ to the plane xoz is |b|, the y axis is parallel to the $y_q$ axis, and an angle between the Z axis and the $z_q$ axis is $(\pi - \theta)$, with $0° \leq \theta \leq 180°$; a space Cartesian coordinate system $o_1 - x_1 y_1 z_1$ is fixedly connected with the driving line gear, $o_1$ is an origin of the coordinate system $o_1 - x_1 y_1 z_1$, and $x_1$, $y_1$, $z_1$ are three coordinate axes of a coordinate system $o_1 - x_1 y_1 z_1$; a space Cartesian coordinate system $o_3 - x_3 y_3 z_3$ is fixedly connected with the driven line gear, $o_3$ is an origin of the coordinate system $o - x_3 y_3 z_3$, $x_3$, $y_3$, $z_3$ are three coordinate axes of the coordinate system $o_3 - x_3 y_3 z_3$, and an initial meshing place of the driving line gear and the driven line gear is an initial position; at the initial position, the coordinate systems $o_1 - x_1 y_1 z_1$ and $o_3 - x_3 y_3 z_3$ coincide with the coordinate systems o−xyz and $o_q - x_q y_q z_q$, respectively; at any time, the origin $o_1$ coincides with o, the $z_1$ axis coincides with the z axis, the origin $o_3$ coincides with $o_q$, and the $z_3$ axis coincides with the $z_q$ axis;

when $0° \leq \theta < 90°$, the driving line gear rotates about the z axis at a uniform angular velocity $\bar{\omega}_1$, a direction of the angular velocity of the driving line gear is a negative direction of the z axis, and an angle that the driving line gear rotates through about the z axis is $\varphi_1$; the driven line gear rotates about the $z_q$ axis at a uniform angular velocity $\bar{\omega}_2$, a direction of the angular velocity of the driven line gear is a negative direction of the $z_q$ axis, and an angle that the driven line gear rotates through about the $z_q$ axis is $\omega_3$; meanwhile, the driven line gear moves along the negative direction of the $z_q$ axis with a speed of A, a displacement of the driven line gear has a magnitude of s, and then a space curve meshing equation thereof is:

$$y_M^{(1)}\bar{\omega}_1\beta_x^{(1)} - x_M^{(1)}\bar{\omega}_1\beta_y^{(1)} + y_M^{(1)}\bar{\omega}_2\beta_x^{(1)}\cos\theta - \\ \bar{\omega}_2 x_M^{(1)}\beta_y^{(1)}\cos\theta(A\sin\theta - c\bar{\omega}_2\cos\theta)\beta_x^{(1)}\cos \\ \varphi_1 + (A\sin\theta - c\bar{\omega}_2\cos\theta)\beta_y^{(1)}\sin\varphi_1 + (\omega_2\sin\theta \\ (z_M^{(1)} - b + s) + \bar{\omega}_2 a\cos\theta)(\beta_x^{(1)}\sin\varphi_1) - (\bar{\omega}_2\sin \\ \theta(z_M^{(1)} - b + s) + \bar{\omega}_2 a\cos\theta)(\beta_y^{(1)}\cos\varphi_1) + (-A\cos \\ \theta - \bar{\omega}_2\sin\theta x_M^{(1)}\sin\varphi_1 + \bar{\omega}_2\sin\theta y_M^{(1)}\cos\varphi_1 - c\bar{\omega}_2 \\ \sin\theta)\beta_z^{(1)} = 0$$

wherein, $$\begin{cases} x_M^{(1)} = x_M^{(1)}(t) \\ y_M^{(1)} = y_M^{(1)}(t) \\ z_M^{(1)} = z_M^{(1)}(t) \end{cases}$$

is an equation of the driving contact curve of the driving line gear, t is a parameter, $\beta^{(1)}=\beta_x^{(1)}i^{(1)}+\beta_y^{(1)}j^{(1)}+\beta_z^{(1)}k^{(1)}$ is a unit vector of a principal normal of the driving contact curve of the mechanism at a meshing point in the coordinate system $o_1-x_1y_1z_1$, $i^{(1)}$, $j^{(1)}$ and $l^{(1)}$ are unit vectors of the $x_1$, $y_1$, $z_1$ axes, an equation of the driven contact curve of the driven line gear in the coordinate system $o_3-x_3y_3z_3$ is:

$$\begin{cases} x_M^{(3)} = (-\cos\varphi_1 \cos\varphi_3 \cos\theta + \sin\varphi_1 \sin\varphi_3)x_M^{(1)} + \\ \quad (-\sin\varphi_1 \cos\varphi_3 \cos\theta - \cos\varphi_1 \sin\varphi_3)y_M^{(1)} - \\ \quad \cos\varphi_3 \sin\theta z_M^{(1)} + (-a\cos\varphi_3 \cos\theta + b\cos\varphi_3 \sin\theta + c\sin\varphi_3) \\ y_M^{(3)} = (-\cos\varphi_1 \sin\varphi_3 \cos\theta - \sin\varphi_1 \cos\varphi_3)x_M^{(1)} + \\ \quad (-\sin\varphi_1 \sin\varphi_3 \cos\theta + \cos\varphi_1 \cos\varphi_3)y_M^{(1)} - \\ \quad \sin\varphi_3 \sin\theta z_M^{(1)} + (-a\sin\varphi_3 \cos\theta + b\sin\varphi_3 \sin\theta - c\cos\varphi_3) \\ z_M^{(3)} = \cos\varphi_1 \sin\theta x_M^{(1)} + \sin\varphi_1 \sin\theta y_M^{(1)} - \cos\theta z_M^{(1)} + a\sin\theta + \\ \quad b\cos\theta - s \end{cases}$$

wherein, $\overline{\omega}_2 = i_{21}\overline{\omega}_1$, $\varphi_3 = i_{21}\varphi_1$, $i_{21}$ is a transmission ratio of the driving line gear to the driven line gear;

when $90° \leq \theta \leq 180°$, the driving line gear rotates about the z axis at the uniform angular velocity $\overline{\omega}_1$, the direction of the angular velocity of the driving line gear is the negative direction of the z axis, at this moment, the driven line gear rotates about the $z_q$ axis at an angular velocity with a magnitude of $\overline{\omega}_2$ and a direction being a positive direction of the $z_q$ axis; meanwhile, the driven line gear moves along the $z_q$ axis at a speed with a magnitude of A and a direction being the positive direction of the $z_q$ axis, an angle that the driving line gear rotates through about the z axis is $\varphi_1$, an angle that the driven line gear rotates through about the $z_q$ axis is $-\varphi_3$, a displacement of moving along the $z_q$ axis is s, and then the space curve meshing equation of the mechanism is:

$-y_M^{(1)}\overline{\omega}_1\beta_x^{(1)}+x_M^{(1)}\overline{\omega}_1\beta_y^{(1)}+y_M^{(1)}\overline{\omega}_2\beta_x^{(1)}\cos\theta-\overline{\omega}_2 x_M^{(1)}\beta_y^{(1)}\cos\theta+(-A\sin\theta-c\overline{\omega}_2\cos\theta)\beta_x^{(1)}\cos\varphi_1+(-A\sin\theta-c\overline{\omega}_2\cos\theta)\beta_y^{(1)}\sin\varphi_1+(\omega_2\sin\theta(z_M^{(1)}-b-s)+\overline{\omega}_2 a\cos\theta)(\beta_x^{(1)}\sin\varphi_1)-(\overline{\omega}_2\sin\theta(z_M^{(1)}-b-s)+\overline{\omega}_2 a\cos\theta)(\beta_y^{(1)}\cos\varphi_1)+(A\cos\theta-\overline{\omega}_2\sin\theta x_M^{(1)}\sin\varphi_1+\overline{\omega}_2\sin\theta y_M^{(1)}\cos\varphi_1-c\overline{\omega}_2\sin\theta)\beta_z^{(1)}=0$ wherein, $$\begin{cases} x_M^{(1)} = x_M^{(1)}(t) \\ y_M^{(1)} = y_M^{(1)}(t) \\ z_M^{(1)} = z_M^{(1)}(t) \end{cases}$$

is an equation of the driving contact curve of the driving line gear in the coordinate system $o_1-x_1y_1z_1$, t is a parameter, $\beta^{(1)}=\beta_x^{(1)}i^{(1)}+\beta_y^{(1)}j^{(1)}+\beta_z^{(1)}k^{(1)}$ is a unit vector of a principal normal of the driving contact curve of the mechanism at a meshing point in the coordinate system $o_1-x_1y_1z_1$, $i^{(1)}$, $j^{(1)}$ and $k^{(1)}$ are unit vectors of the $x_1$, $y_1$, $z_1$ axes, an equation of the driven contact curve of the driven line gear in the coordinate system $o_3-x_3y_3z_3$ is:

$$\begin{cases} x_M^{(3)} = (-\cos\varphi_1 \cos\varphi_3 \cos\theta - \sin\varphi_1 \sin\varphi_3)x_M^{(1)} + \\ \quad (-\sin\varphi_1 \cos\varphi_3 \cos\theta + \cos\varphi_1 \sin\varphi_3)y_M^{(1)} - \\ \quad \cos\varphi_3 \sin\theta z_M^{(1)} + (-a\cos\varphi_3 \cos\theta + b\cos\varphi_3 \sin\theta - c\sin\varphi_3) \\ y_M^{(3)} = (\cos\varphi_1 \sin\varphi_3 \cos\theta - \sin\varphi_1 \cos\varphi_3)x_M^{(1)} + \\ \quad (\sin\varphi_1 \sin\varphi_3 \cos\theta + \cos\varphi_1 \cos\varphi_3)y_M^{(1)} + \\ \quad \sin\varphi_3 \sin\theta z_M^{(1)} + (a\sin\varphi_3 \cos\theta - b\sin\varphi_3 \sin\theta - c\cos\varphi_3) \\ z_M^{(3)} = \cos\varphi_1 \sin\theta x_M^{(1)} + \sin\varphi_1 \sin\theta y_M^{(1)} - \cos\theta z_M^{(1)} + a\sin\theta + \\ \quad b\cos\theta + s \end{cases}$$

wherein $\overline{\omega}_2 = i_{21}\overline{\omega}_1$, $\varphi_3 = i_{21}\varphi_1$, $i_{21}$ is a transmission ratio of the driving line gear to the driven line gear.

* * * * *